United States Patent [19]
Tateoka

[11] Patent Number: 5,463,418
[45] Date of Patent: Oct. 31, 1995

[54] PLURAL-BEAM SCANNING OPTICAL APPARATUS

[75] Inventor: Masamichi Tateoka, Yokohama, Japan

[73] Assignee: Canon Kabushiki Kaisha, Tokyo, Japan

[21] Appl. No.: 56,740

[22] Filed: May 4, 1993

Related U.S. Application Data

[63] Continuation of Ser. No. 922,775, Jul. 31, 1992, abandoned.

[30] Foreign Application Priority Data

Aug. 3, 1991 [JP] Japan ..................... 3-217868

[51] Int. Cl.⁶ ............................................. B41J 2/435
[52] U.S. Cl. ............................................. 347/244; 347/259
[58] Field of Search ........................... 346/1.1, 26 L, 346/108, 107 R, 160; 358/296, 300, 302; 355/200, 202; 347/241, 244, 256, 258, 259

[56] References Cited

U.S. PATENT DOCUMENTS

| | | | |
|---|---|---|---|
| 4,253,102 | 2/1981 | Kataoka et al. | 346/108 |
| 4,253,724 | 3/1981 | Minoura et al. | 350/6.8 |
| 4,624,555 | 11/1986 | Tokuhara et al. | 355/71 |
| 4,682,316 | 7/1987 | Tateoka et al. | 359/46 |
| 5,251,055 | 10/1993 | Koide | 359/216 |

FOREIGN PATENT DOCUMENTS

| | | |
|---|---|---|
| 0388981 | 9/1990 | European Pat. Off. . |
| 2917163 | 11/1979 | Germany . |
| 3314402 | 10/1993 | Germany . |
| 54-158251 | 12/1979 | Japan . |
| 2138162 | 10/1984 | United Kingdom . |

*Primary Examiner*—Mark J. Reinhart
*Attorney, Agent, or Firm*—Fitzpatrick, Cella, Harper & Scinto

[57] ABSTRACT

A plural-beam scanning optical apparatus comprises a light source having a plurality of light emitting portions, a first optical system for converting a plurality of divergent light beams from the light source into parallel light beams, a light deflector for deflecting the plurality of light beams from the first optical system, a stop disposed between the first optical system and the light deflector, and a second optical system for condensing the plurality of light beams deflected by the light deflector on a scanned surface. The plurality of light emitting portions are arranged in a direction oblique with respect to the main scanning direction of the light beams on the scanned surface. The apparatus satisfies the following condition:

$$d/2 \cdot (n-1) \cdot L/f < 0.2,$$

where n is the number of the plurality of light emitting portions, d is the pitch thereof, L is the distance from a reference position on the deflecting surface of the light deflector to the stop, and f is the focal length of the first optical system.

8 Claims, 2 Drawing Sheets

PLURAL-BEAM SCANNING OPTICAL APPARATUS

This application is a continuation of prior application, Ser. No. 07/922,775 filed Jul. 31, 1992, now abandoned.

BACKGROUND OF THE INVENTION

1. Field of the Invention

This invention relates to a plural-beam scanning optical apparatus, and particularly to a plural-beam scanning optical apparatus suitable for use in an apparatus such as a laser beam printer (L 13P) in which use is made of light source means having a plurality of light emitting portions and a plurality of light beams emitted from said light source means are directed to the surface of a photosensitive medium which is a scanned surface through a light deflector such as a rotatable polygonal mirror, whereby the surface of the photosensitive medium is scanned by the plurality of light beams at a time to effect, for example, the formation of image information.

2. Related Background Art

A so-called plural-beam scanning optical system designed to collectively scan the surface of a photosensitive medium which is a scanned surface by a plurality of light beams which can be optically modulated independently of one another has heretofore been proposed, for example, in Japanese Laid-Open Patent Application No. 54-158251.

Generally, to obtain a good quality of image with a high resolving power when a scanned surface is scanned by a plurality of light beams to thereby form an image, it is necessary to make the spot diameter of the light beams on the scanned surface small and densely form the spots of the light beams in the sub-scanning direction.

Generally, in a plural-beam scanning optical system, in order to make the spots in the sub-scanning direction dense, use is often made of light source means having a semiconductor laser array disposed obliquely with respect to the main scanning direction. Such a scanning apparatus is disclosed in U.S. Pat. No. 4,253,102.

FIG. 1 of the accompanying drawings is a schematic view of the essential portions of a plural-beam scanning optical apparatus according to the prior art.

In FIG. 1, reference numeral 11 designates light source means such as a semiconductor laser array. From a plurality of light emitting portions 11a and 11b provided on the light source means 11, central rays $h_a$ and $h_b$ are emitted in parallel to the optical axis g of a condensing lens 12. These central rays $h_a$ and $h_b$ pass through the focus F of the condensing lens 12, and pass through a cylindrical lens 13 having refractive power in the sub-scanning direction, and thereafter are incident on the deflecting surface 14a of a light deflector 14.

By this cylindrical lens 13, the light beams emitted from the light emitting portions 11a and 11b and passed through the condensing lens 12 are formed as linear images in the main scanning cross-section near the deflecting surface 14a. At this time, the central rays $h_a$ and $h_b$ from the light emitting portions 11a and 11b are incident on and reflected by the deflecting surface 14a at locations thereon spaced apart from each other in the direction of deflection of the light beams by the deflecting surface.

The light beams reflected by the deflecting surface 14a are imaged on the scanned surface 16 of a scanned medium such as a photosensitive member by a scanning lens system 15 comprising an anamorphic system.

FIG. 2 of the accompanying drawings is a schematic view showing the optical path in the sub-scanning cross-section from the light deflector 14 to the scanned surface 16. As indicated by solid lines in FIG. 2, the scanning lens system 15 is designed such that the deflecting surface 14a and the scanned surface 16 are in substantially conjugate relationship with each other in the sub-scanning cross-section.

In the plural-beam scanning optical apparatus shown in FIG. 1, the central rays $h_a$ and $h_b$ emitted from the light emitting portions 11a and 11b, respectively, of the light source means 11 are incident on the deflecting surface 14a at locations thereon spaced apart from each other, as previously described.

That is, of the center positions of the plurality of linear images on the deflecting surface 14a formed by the cylindrical lens 13, the center position of only the linear image corresponding to one of the plurality of light emitting portions can be installed at a desired location, for example, on the deflecting surface. However, the center position of the other linear image becomes spaced apart from the desired location.

That is, like the optical path indicated by broken lines in FIG. 2, the other linear image is formed at a location 14b deviating from the deflecting surface 14a. The center position Pa of the deviating linear image at this time is not imaged on the scanned surface 16, but is imaged at a point Pb spaced apart from the scanned surface 16, by the scanning lens system 15. That is, the deviating linear image becomes defocused on the scanned surface 16. The defocus amount at this time becomes greater as the light deflector 14 is rotated.

That is, there arises a problem that the spot diameter of the light beams on the scanned surface 16 increases and highly accurate optical scanning becomes impossible.

Also, as previously described, the light beams emitted from the light emitting portions 11a and 11b of the light source means 11 are incident on the deflecting surface 14a at locations thereon spaced apart from each other and are reflected and deflected, and this has led to a problem that as compared with a scanning optical apparatus using a single light beam, the deflecting surface must be made large and the deflector becomes correspondingly bulky and high-speed scanning at high accuracy becomes difficult.

SUMMARY OF THE INVENTION

The present invention has as its object the provision of a plural-beam scanning optical apparatus in which when a scanned surface is scanned by a plurality of light beams from light source means such as a semiconductor laser array, the light beams are well focused on the scanned surface and which is capable of scanning at high density and high accuracy and may use a light deflector of substantially the same size as in wherein a single light beam is used and which is capable of high-speed scanning.

The plural-beam scanning optical apparatus of the present invention is characterized in that a plurality of light beams emitted from light source means having a plurality of light emitting portions capable of effecting light modulation independently of one another are collimated by a first optical system and directed to a light deflector through a stop, and the light beams deflected by said light deflector are directed onto a scanned surface by a second optical system, and when said scanned surface is optically scanned by said plurality of light beams at one time, said plurality of light emitting portions are arranged in a direction oblique with respect to the main scanning direction of the light beams on said scanned surface, and said plural-beam scanning optical apparatus satisfies the following condition:

$$d/2 \cdot (n-1) \cdot L/f < 0.2 \tag{1}$$

where n is the number of said plurality of light emitting portions, d is the pitch thereof, L is the distance from the reference position of the deflecting surface of said light deflector, and f is the focal length of said first optical system.

The present invention is further characterized in that an anamorphic lens having refractive power in the sub-scanning direction is disposed in the optical path between said first optical system and said light deflector so that in the sub-scanning cross-section, the light beams from said first optical system may be condensed on the deflecting surface of said light deflector, and said second optical system is comprised of an anamorphic system so that in the sub-scanning cross-section, said deflecting surface and said scanned surface may be in substantially conjugate relationship with each other and an f-θ characteristic may be had in the main scanning cross-section.

DESCRIPTION OF THE PREFERRED EMBODIMENT

Figure 3:
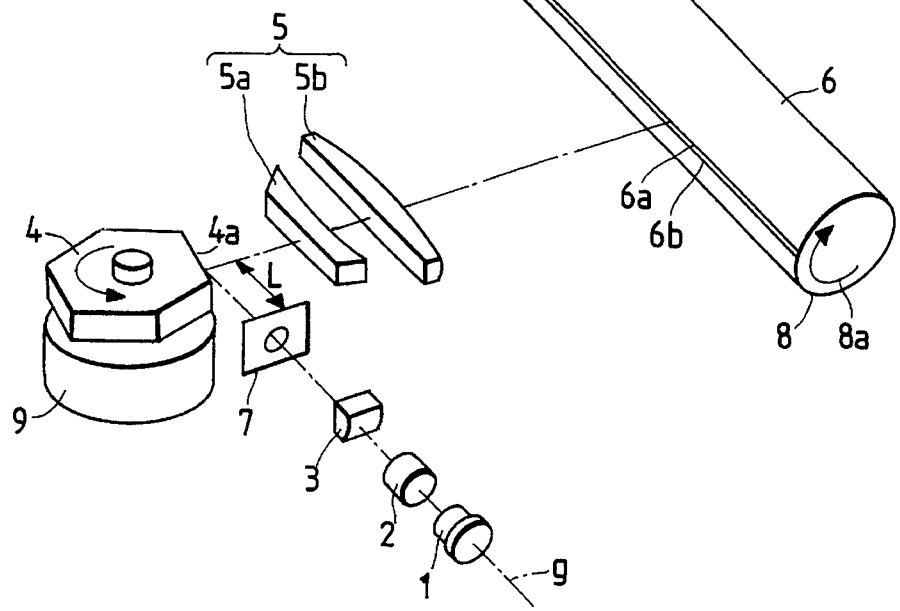
FIG. 3 is a perspective view of the essential portions of a plural-beam scanning optical apparatus according to an embodiment of the present invention.
Figure 4:
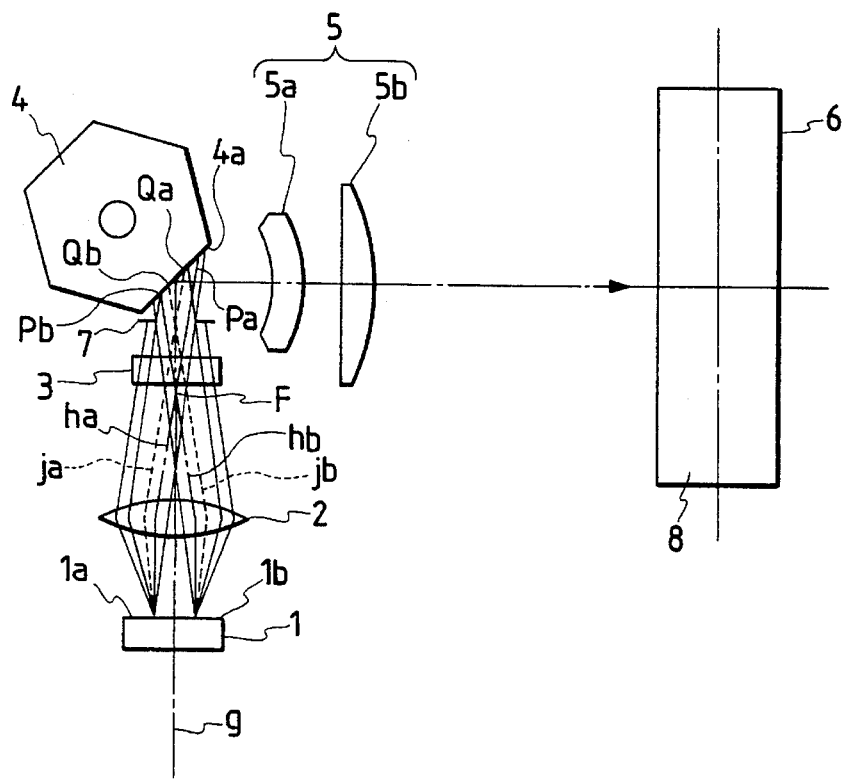
FIG. 4 is a schematic view of the essential portions of FIG. 3 in the main scanning cross-section.

FIG. 3 is a perspective view of the essential portions of an embodiment of the plural-beam scanning optical apparatus of the present invention, and FIG. 4 is a schematic view of the essential portions of the FIG. 3 embodiment in the main scanning cross-section thereof. The main scanning cross-section refers to a light beam cross-section formed with the lapse of time by a light beam deflected by a deflecting surface 4a.

In these figures, reference numeral 1 designates light source means having a plurality of light emitting portions 1a and 1b and comprising, for example, a semiconductor laser array or the like. The light emitting portions 1a and 1b are disposed in a direction oblique with respect to the main scanning direction in which light beams are scanned, and the spacing d therebetween is d=100 μm. Divergent light beams are emitted from the plurality of light emitting portions 1a and 1b, respectively. Like this, the plurality of light emitting portions are disposed in the same direction as the main scanning direction or in an oblique direction differing from a direction perpendicular to the main scanning direction.

The reference characters $h_a$ and $h_b$ denote central rays emitted from the light emitting portions 1a and 1b, respectively, parallel to the optical axis g of a condensing lens 2 (having a focal length f=10.2 mm) as a first optical system. Light beams consisting chiefly of these central rays $h_a$ and $h_b$ pass as parallel light beams through the condensing lens 2 (the central rays $h_a$ and $h_b$ pass through the focus F of the condensing lens 2), and pass through a cylindrical lens 3 having refractive power in the sub-scanning direction containing the optical axis g and orthogonal to the main scanning direction, and thereafter pass through a stop 7 which limits chiefly the light beams in the main scanning direction and are incident on the deflecting surface 4a of a light deflector 4. If there is no stop 7 at this time, the central rays $h_a$ and $h_b$ of the respective light beams will be incident on and reflected by positions Pa and Pb spaced apart from each other on the deflecting surface 4a.

So, in the present embodiment, the stop 7 is provided at a predetermined position spaced apart from the deflecting surface 4a as will be described later, whereby the positions of the central rays of the light beams incident on the deflecting surface 4a are changed so that the central rays may be incident on and reflected by substantially the same position on the deflecting surface 4a.

That is, by the stop 7 being provided, the light beams are limited in the main scanning cross-section and the central rays are changed from $h_a$ and $h_b$ before entering the stop 7 into rays $j_a$ and $j_b$ passing through the center of the stop 7.

Thereby, the central rays $j_a$ and $j_b$ approach each other on the deflecting surface 4a as indicated by positions Qa and Qb and moreover, are incident on and reflected by the vicinity of the incidence positions of the rays on the optical axis g of the condensing lens 2.

The cylindrical lens 3 forms linear images in the main scanning cross-section near the deflecting surface 4a from the light beams emitted from the light emitting portions 11a and 11b.

The light beams reflected by the deflecting surface 4a are imaged on the surface (the scanned surface) 6 of a photosensitive drum 8 or the like by a scanning lens system 5 comprising an anamorphic system as a second optical system having different refractive powers in the main scanning direction and the sub-scanning direction. The scanning lens system 5 comprises a spherical lens 5a and a toric lens 5b having different refractive powers in the main scanning cross-section and the sub-scanning cross-section containing the optical axis and orthogonal to the main scanning cross-section and having a toric surface, and has an f-θ characteristic in the main scanning cross-section.

The light deflector 4 is rotated by driving means 9 such as a motor, whereby the scanned surface 6 of the photosensitive drum 8 which is a recording medium is optically scanned by two light spots 6a and 6b. Therewith, the photosensitive drum 8 is rotated in the direction of arrow 8a, whereby the scanned surface 6 is optically scanned at equal speeds in the sub-scanning direction by the two light spots 6a and 6b.

In the present embodiment, in the sub-scanning cross-section, the deflecting surface 4a and the scanned surface 6 are in substantially conjugate relationship with each other, and in the main scanning cross-section, light output portions 11a, 11b and the scanned surface 6 are in substantially conjugate relationship with each other.

Each element in the present embodiment will now be described.

Figure 1:
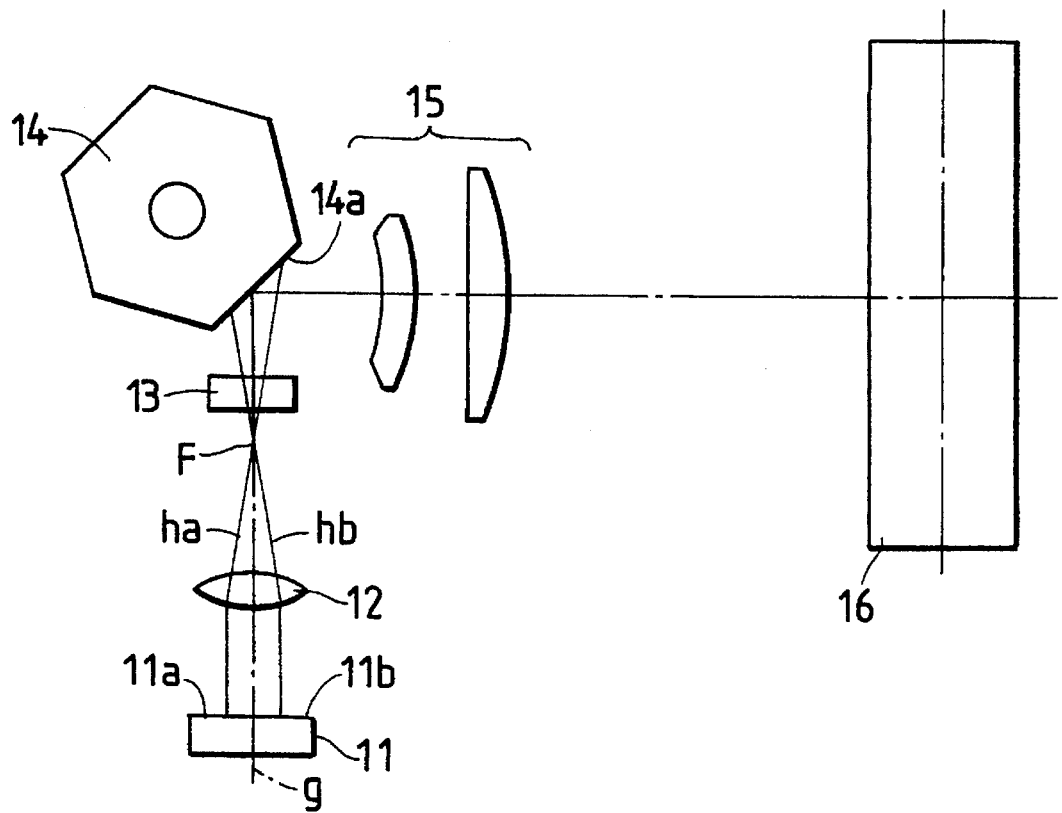
FIG. 1 is a schematic view of the essential portions of a plural-beam scanning optical apparatus according to the prior art in the main scanning cross-section thereof.
Figure 2:
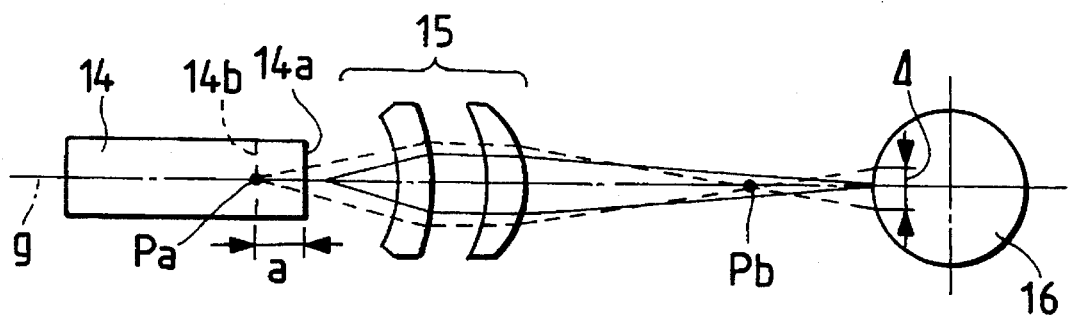
FIG. 2 is a schematic view of some portions of FIG. 1 in the sub-scanning cross-section.

Considering with reference to FIG. 2, when the distance from the optical axis g to the reflecting point on the deflecting surface 14a in a direction perpendicular to the optical axis g is a and the magnification of the scanning lens system 15 in the sub-scanning direction is β, the defocus amount Δ on the scanned surface is in the relation that $$\Delta \approx 2a \times \beta^2.$$

When in the plural-beam scanning optical apparatus of the present invention shown in FIG. 3, the number of the light emitting portions of the light source means 1 is n and the pitch thereof is d and the distance from the stop 7 to the reference position on the deflecting surface of the light deflector 4 (the position in which the ray on the optical axis g is incident on the deflecting surface positioned when in the main scanning cross-section, the light beam is incident on the central portion of the scanning range of the scanned surface) is L and the focal length of the condensing lens 2 for collimating the divergent light beams from the light source means 1 is f, the distance a is $$a = d/2(n-1) \times L/f.$$

Also, when for example, in the scanning optical apparatus of a laser beam printer or the like, the allowable amount of the depth of focus on the scanned surface is considered, it is rare that if the distance a is approximately a $\leq 0.2$, the aforementioned defocus amount will not adversely affect the image. So, in the present embodiment, as previously described, the stop 7 is provided between the deflecting surface 4a and the condensing lens 2 so as to achieve $$d/2(n-1) \times L/f < 0.2.$$

In the present embodiment, L=20 mm, from which the distance a is a $\approx 0.1$ mm. This distance a is about ¼ as compared with a case wherein the stop 7 is not provided.

In the present embodiment, each element is appropriately set in this manner, whereby the diameter of the imaged spots of the light beams on the scanned surface can be placed within the depth of focus of the scanning lens system 5 and thus, highly dense and highly accurate scanning is made possible. Also, the light deflector is substantially of the same size as that when a single light beam is used. Thereby, high-speed scanning is made possible without the load to the motor or the like being increased.

Further, in the present embodiment, if each element is set so as to satisfy the aforementioned conditional expression (1), the light source means 1 may have more than two light emitting portions and an effect similar to that previously described will be obtained.

According to the present invention, there can be achieved a plural-beam scanning optical apparatus in which each element is set as described above, whereby when a scanned surface is scanned by a plurality of light beams at one time by the use of light source means such as a semiconductor laser array, each light beam is focused well on the scanned surface and highly dense and highly accurate scanning is possible and use may be made of a light deflector of substantially the same size as that when a single light beam is used, and high-speed scanning is possible.

What is claimed is:

1. A plural-beam scanning optical apparatus comprising:

light source means having a plurality of light emitting portions;

a first optical system for converting a plurality of divergent light beams from said light source means into parallel light beams;

a light deflector for deflecting the plurality of light beams from said first optical system;

a stop disposed between said first optical system and said light deflector; and a second optical system for condensing the plurality of light beams deflected by said light deflector on a scanned surface, said plurality of light emitting portions being arranged in a direction oblique with respect to the main scanning direction of the light beams on said scanned surface, said apparatus satisfying the following condition:

$$d/2 \cdot (n-1) \cdot L/f < 0.2 \text{(mm)},$$

where n is the number of said plurality of light emitting portions, d is the pitch thereof, L is the distance from a reference position on the deflecting surface of said light deflector to said stop, and f is the focal length of said first optical system.

2. A plural-beam scanning optical apparatus according to claim 1, further comprising an anamorphic lens having refractive power in the sub-scanning direction disposed in the optical path between said first optical system and said light deflector so that in the sub-scanning cross-section, the light beams from said first optical system may be condensed on the deflecting surface of said light deflector, and wherein said second optical system is comprised of an anamorphic system, and in the sub-scanning cross-section, said deflecting surface and said scanned surface are in substantially conjugate relationship with each other, and an f-θ characteristic is had in the main scanning cross-section.

3. A plural-beam recording apparatus comprising:

light source means having a plurality of light emitting portions;

a first optical system for converting a plurality of divergent light beams from said light source means into parallel light beams;

a light deflector for deflecting the plurality of light beams from said first optical system;

a stop disposed between said first optical system and said light deflector;

a recording medium; and a second optical system for condensing the plurality of light beams deflected by said light deflector on said recording medium;

said plurality of light emitting portions being arranged in a direction oblique with respect to the main scanning direction of the light beams on said recording medium, said apparatus satisfying the following condition:

$$d/2 \cdot (n-1) \cdot L/f < 0.2 \text{(mm)},$$

where n is the number of said plurality of light emitting portions, d is the pitch thereof, L is the distance from a reference position on the deflecting surface of said light deflector to said stop, and f is the focal length of said first optical system.

4. A plural-beam recording apparatus according to claim 3, further comprising an anamorphic lens having refrative power in the sub-scanning direction disposed in the optical path between said first optical system and said light deflector so that in the sub-scanning cross-section, the light beams from said first optical system may be condensed on the deflecting surface of said light deflector, and wherein said second optical system is comprised of an anamorphic system, and in the sub-scanning cross-section, said deflecting surface and said recording medium are in substantially conjugate relationship with each other, and an f-θ characteristic is had in the main scanning cross-section.

5. A plural-beam scanning optical apparatus comprising:

light source means having a plurality of light emitting portions;

a first optical system for converting a plurality of divergent light beams from said light source means into parallel light beams;

a light deflector for deflecting the plurality of light beams from said first optical system;

a stop disposed between said first optical system and said light deflector; and a second optical system for condensing the plurality of light beams deflected by said light deflector on a scanned surface, wherein said plurality of light emitting portions are arranged in a predetermined direction, said apparatus satisfying the following condition:

$$d/2 \cdot (n-1) \cdot L/f < 0.2 \text{(mm)},$$

where n is the number of said plurality of light emitting portions, d is the pitch thereof, L is the distance from a reference position on the deflecting surface of said light deflector to said stop and f is the focal length of said first optical system.

6. A plural-beam scanning optical apparatus according to claim 5, further comprising an anamorphic lens having refractive power in the sub-scanning direction disposed in the optical path between said first optical system and said light deflector so that in the sub-scanning cross-section, the light beams from said first optical system may be condensed on the deflecting surface of said light deflector, and wherein said second optical system is comprised of an anamorphic system, and in the sub-scanning cross-section, said deflecting surface and said scanning surface are in substantially conjugate relationship with each other and the main scanning cross-section has an f-θ characteristic.

7. A plural-beam recording apparatus comprising:

light source means having a plurality of light emitting portions;

a first optical system for converting a plurality of divergent light beams from said light source means into parallel light beams;

a light deflector for deflecting the plurality of light beams from said first optical system;

a stop disposed between said first optical system and said light deflector;

a recording medium; and a second optical system for condensing the plurality of light beams deflected by said light deflector on said recording medium, wherein said plurality of light emitting portions are arranged in a predetermined direction, said apparatus satisfying the following condition:

$$d/2 \cdot (n-1) \cdot L/f < 0.2 \text{(mm)},$$

where n is the number of said plurality of light emitting portions, d is the pitch thereof, L is the distance from a reference position on the deflecting surface of said light deflector to said stop and f is the focal length of said first optical system.

8. A plural-beam recording apparatus according to claim 7, further comprising an anamorphic lens having refractive power in the sub-scanning direction disposed in the optical path between said first optical system and said light deflector so that in the sub-scanning cross-section, the light beams from said first optical system may be condensed on the deflecting surface of said light deflector, and wherein said second optical system is comprised of an anamorphic system, and in the sub-scanning cross-section, said deflecting surface and said recording medium are in substantially conjugate relationship with each other and the main scanning cross-section has an f-θ characteristic.

* * * * *

UNITED STATES PATENT AND TRADEMARK OFFICE
CERTIFICATE OF CORRECTION

PATENT NO. : 5,463,418
DATED : October 31, 1995
INVENTOR(S) : Masamichi TATEOKA

It is certified that error appears in the above-indentified patent and that said Letters Patent is hereby corrected as shown below:

ON THE COVER PAGE:

UNDER "FOREIGN PATENT DOCUMENTS":

"3314402 10/1993 Germany" should read
--3314402 10/1983 Germany--

COLUMN 1:

Line 20, "a" should read --one--.

Line 48, "in" should be deleted.

COLUMN 2:

Line 56, "in wherein" should read --in a case wherein--.

UNITED STATES PATENT AND TRADEMARK OFFICE
CERTIFICATE OF CORRECTION

PATENT NO. : 5,463,418
DATED : October 31, 1995
INVENTOR(S) : Masamichi TATEOKA

It is certified that error appears in the above-indentified patent and that said Letters Patent is hereby corrected as shown below:

COLUMN 6:

Line 49, "refrative" should read --refractive--.

Signed and Sealed this

Sixteenth Day of April, 1996

BRUCE LEHMAN

*Attest:*

*Attesting Officer*     Commissioner of Patents and Trademarks